(12) United States Patent
Maeda et al.

(10) Patent No.: US 6,568,180 B2
(45) Date of Patent: May 27, 2003

(54) TORQUE CONVERTER

(75) Inventors: Koji Maeda, Anjo (JP); Tomohiro Yamashita, Anjo (JP)

(73) Assignee: Aisin Aw Co., Ltd., Anjo (JP)

( * ) Notice: Subject to any disclaimer, the term of this patent is extended or adjusted under 35 U.S.C. 154(b) by 36 days.

(21) Appl. No.: 09/883,181

(22) Filed: Jun. 19, 2001

(65) Prior Publication Data

US 2001/0052233 A1 Dec. 20, 2001

(30) Foreign Application Priority Data

Jun. 19, 2000 (JP) ........................... 2000-183516

(51) Int. Cl.[7] ............................................... F16D 33/00
(52) U.S. Cl. ............................................. 60/345
(58) Field of Search ...................................... 60/345

(56) References Cited

U.S. PATENT DOCUMENTS 2,994,197 A * 8/1961 Mamo ........................ 60/345
5,706,656 A * 1/1998 Hinkel ....................... 60/345

FOREIGN PATENT DOCUMENTS

JP          8-14382          1/1996

* cited by examiner

*Primary Examiner*—Edward K. Look
*Assistant Examiner*—Michael Leslie
(74) *Attorney, Agent, or Firm*—Oliff & Berridge, PLC

(57) ABSTRACT

A torque converter including a one-way clutch for supporting a stator radially on a fixed member in such a manner that the stator is rotatable in one direction, and a pair of thrust bearings for supporting the stator axially between a pump impeller and a turbine runner, wherein the diameters of the one-way clutch and both of the thrust bearings are different, and the thrust bearings do not axially overlap at least side bearings of the one-way clutch. With this arrangement, thrust force is not applied to the side bearings, and thus, the side bearings are thinner than conventional side bearings. Accordingly, the area radially inside of the stator in the torque converter is axially shortened.

20 Claims, 4 Drawing Sheets

TORQUE CONVERTER

INCORPORATION BY REFERENCE

The disclosure of Japanese Patent Application No. 2000-183516 is incorporated herein by reference in its entirety.

BACKGROUND OF THE INVENTION

1. Field of Invention

The invention relates to a torque converter and, in particular, to a thrust force supporting structure of a stator thereof.

2. Description of Related Art

A torque converter is generally configured to have a stator interposed between a pump impeller and a turbine runner. The stator is radially supported on an appropriate fixed member, through an annular one-way clutch, in such a manner that the stator is rotatable in one direction. At the same time, the stator is axially supported between the pump impeller and the turbine runner (in particular, its hub) through annular thrust bearings. Conventionally, the diameters of the one-way clutch and the thrust bearings for supporting the stator are substantially the same. In addition, the one-way clutch and the thrust bearings are arranged to axially overlap one another such that the one-way clutch is interposed between thrust bearings (See Japanese Patent Laid-Open Publication No.HEI8-14382 as an example).

As mentioned above, in a conventional torque converter, a one-way clutch and a pair of thrust bearings are axially arranged in substantially the same radial position in the area radially inside of a stator. This arrangement creates a long axial length of an inner area of a torque converter, and thus prevents the axial length of a torque converter from becoming shorter. In addition, since thrust bearings overlap side bearings of the one-way clutch, the thrust force is transmitted between the thrust bearings and an outer race of the one-way clutch through the side bearings of the one-way clutch. Therefore, the side bearings should be thick enough to bear this thrust force. Furthermore, side bearings need to have a complicated shape to transmit a thrust force between the thrust bearings and the outer race of the one-way clutch, which are arranged in different radial positions.

Also, automatic transmissions for automotive vehicles are becoming multi-speed types, and accordingly, the transmission mechanism is becoming complicated. Under these circumstances, it is necessary to prevent the axial length of the transmissions from becoming longer due to the increase in the complexity of the transmission mechanism. Thus, there is a strong need for shortening the axial length of a torque converter for an automatic transmission, especially for front engine front drive or a rear engine rear drive vehicles in which an automatic transmission and an engine are transversally arranged in an axial direction within the width of the tread.

SUMMARY OF THE INVENTION

Accordingly, the invention provides a torque converter wherein an axial length of the area radially inside of a stator is shortened by improving the arrangement of a one-way clutch and thrust bearings.

To achieve this, a torque converter, according to a first exemplary aspect of the invention, comprises a one-way clutch for supporting a stator radially on a fixed member in such a manner that the stator is rotatable in one direction, and thrust bearings for supporting the stator axially between a pump impeller and a turbine runner, characterized in that the diameters of the one-way clutch and the thrust bearings are different, and the thrust bearings do not axially overlap at least side bearings of the one-way clutch. In the above configuration, since a thrust force is transmitted between the stator and the thrust bearings without the intermediation of the side bearings of the one-way clutch, the thrust load is not applied to the side bearings and the side bearings are made thinner than conventional side bearings. Thus, the axial length of the area radially inside of the stator in the torque converter can be shortened. Also, because the thrust force does not need to be transmitted, the shape of the side bearings can be simplified.

In an embodiment of the first exemplary aspect of the invention, at least a portion of the thrust bearings is arranged to radially overlap the one-way clutch. Therefore, the axial length of the area for arranging the one-way clutch and the thrust bearings can be shortened by the axial length of the radially overlapping portion. Thus, the axial length of the area radially inside of the stator can be shortened even further.

In another embodiment of the first exemplary aspect of the invention, the thrust bearings are arranged radially outside of the one-way clutch. Therefore, it becomes possible to improve durability of the thrust bearings by enlarging the diameter of the thrust bearings, for which securing durability is usually more difficult than for a one-way clutch of the same diameter.

In a further embodiment of the first exemplary aspect of the invention, oil passages forming a communicative connection between radially outside and inside of the thrust bearings are provided on a supporting surface of a member abutting to the thrust bearings. Therefore, since it is possible to provide oil passages required for supplying and exhausting hydraulic oil to and from a truss portion of the torque converter without providing oil passages in the side bearings, the shape of the side bearings can be simplified, thereby reducing the manufacturing costs.

BRIEF DESCRIPTION OF THE DRAWINGS

Various exemplary embodiments of the invention will be described in detail, with reference to the following figures wherein.

DETAILED DESCRIPTION OF PREFERRED EXEMPLARY EMBODIMENTS

Figure 1:
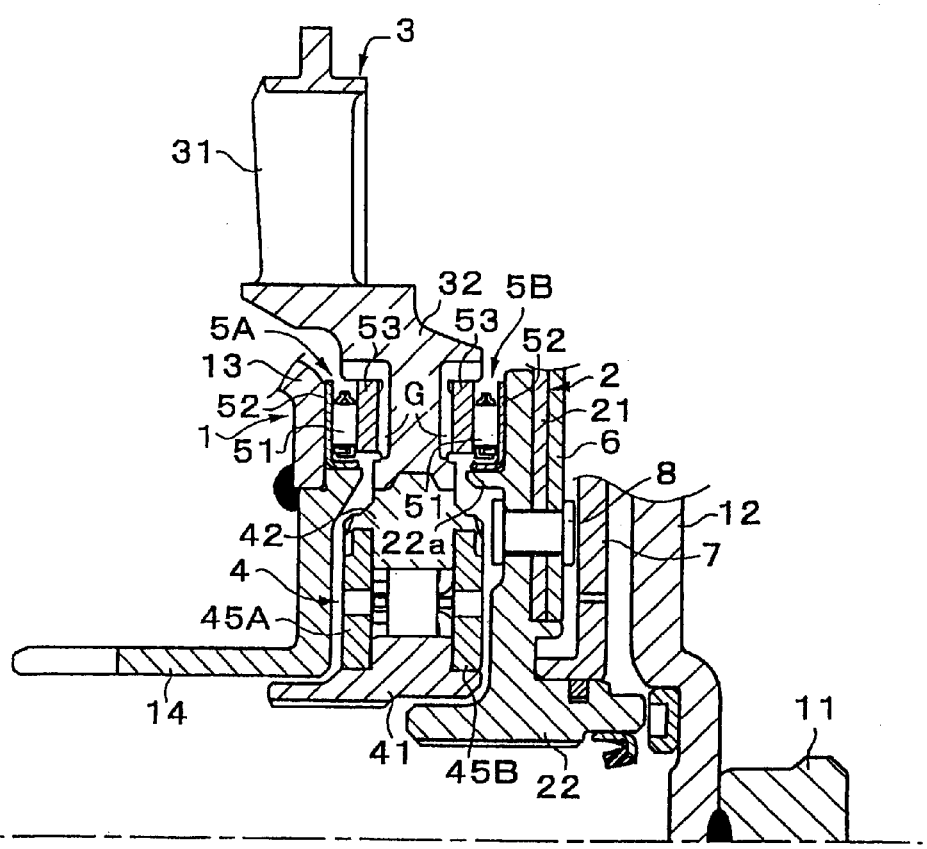
FIG. 1 is a partially half-cut sectional side view of a torque converter according to the first exemplary embodiment of the invention in which a truss portion and a lock-up clutch are omitted.
Figure 2:
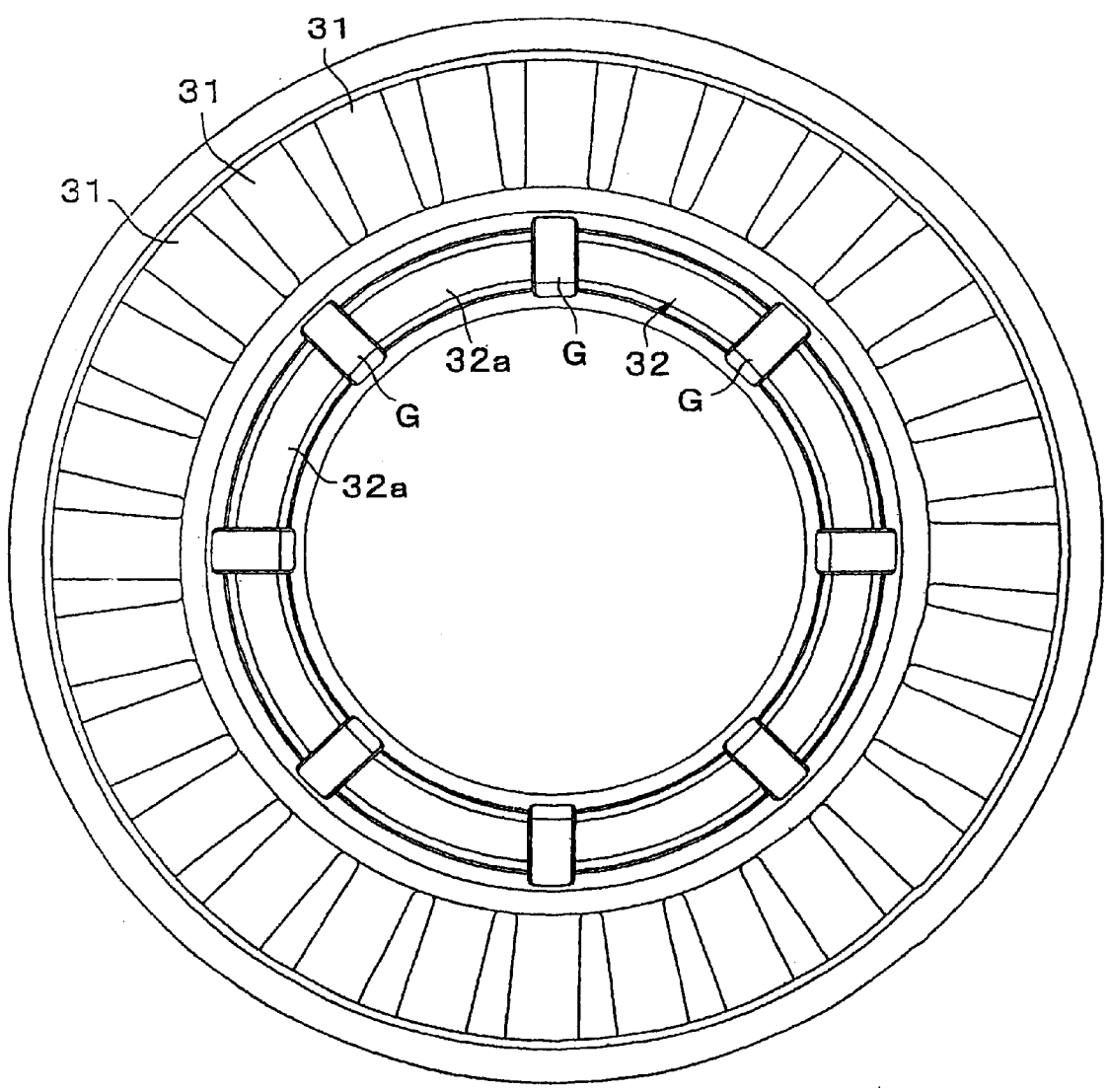
FIG. 2 is a front view illustrating only the stator of the torque converter shown in FIG. 1.

Hereinafter, exemplary embodiments of the invention will be explained with reference to the drawings. FIG. 1 is a partially sectional side view of a torque converter according to the first exemplary embodiment of the invention in which a truss and a lock-up clutch are omitted. FIG. 2 is a front view illustrating only the stator of the torque converter shown in FIG. 1. As shown in FIG. 1, similar to conventional torque converters, the torque converter comprises a one-way clutch 4 for supporting a stator 3 radially on a fixed member (not shown) in such a manner that the stator is rotatable in one way, and a pair of thrust bearings 5A, 5B for supporting the stator 3 axially between a pump impeller 1 and a turbine runner 2.

According to the invention, the diameters of the one-way clutch 4 and both the thrust bearings 5A, 5B are different, and the thrust bearings 5A, 5B do not axially overlap side bearings 45A, 45B of the one-way clutch 4. Also, in this exemplary embodiment, at least a portion of both thrust bearings 5A, 5B radially overlaps the one-way clutch 4. In addition, oil passages G form a communicative connection between an outside and inside of both thrust bearings 5A, 5B provided on a supporting surface 32a (See FIG. 2) of a member 32 (a stator hub in this exemplary embodiment described later) abutting both thrust bearings 5A, 5B. The thrust bearings 5A, 5B are arranged radially outside of the one-way clutch 4.

The torque converter is defined by a center piece 11 aligned with and fitted to a crankshaft of an engine (not shown), a converter cover 12 mounted on a drive plate, a pump shell 13 integrated with the converter cover 12 by welding, and a pump hub 14 integrated with the pump shell 13 by welding and connected with an oil pump (not shown). A turbine shell 21 opposing a pump shell 13 is riveted to a turbine hub 22 by means of a rivet 8 in a more inward radial position than that of the thrust bearing 5B, with the inner side thereof in contact with a damper disk 6. A piston 7 of a lock-up clutch (not shown) is supported slidably in an axial direction on an outer periphery of a boss portion of the turbine hub 22 extending toward the converter cover 12 (as shown in the right part of FIG. 1).

The stator 3 has a blade portion 31 interposed between the pump shell 13 and the turbine shell 21 and is supported by the one-way clutch 4 on an appropriate hollow shaft type fixed member extending from a case of an automatic transmission. A stator hub 32, radially inside of the stator 3, is supported by the one-way clutch 4. In this arrangement, the aluminum stator hub 32 is secured by casting to an outer periphery of a steel outer race 42 of the one-way clutch 4.

The one-way clutch 4 consists of the outer race 42, an inner race 41 radially inside of the outer race 42, various elements interposed between both races for one-way engagement, and a pair of side bearings 45A, 45B provided on both axial ends for supporting the outer race 42 radially on the inner race 41. The inner race 41 is connected with the hollow shaft type fixed member by spline fitting. In this arrangement, the paired bearings 45A, 45B are in the same shape for the purpose of reducing the cost, and the outer periphery of each side bearing is secured to the outer race 42 by caulking. Thus, each side bearing is supported on the outer race 42.

The paired thrust bearings 5A, 5B, for axially supporting the stator 3, are arranged between the side of the radially innermost portion of the pump shell 13 and the side of the stator hub 32, and the side of the stator hub 32 and the side of the radially outermost portion of the turbine hub 22, respectively. In this arrangement, each of the thrust bearings 5A, 5B comprises a pair of thin race 52 and thick race 53, and a bearing roller 51 spaced circumferentially by a cage and interposed therebetween. Both of the thrust bearings 5A, 5B have the same specifications, in other words, they have the same diameter and shape. Both of the thrust bearings 5A, 5B are also arranged plane-symmetrically with respect to the stator hub 32 with the both thick races 53 opposing one another. The purpose of using the thrust bearings of the same specifications is to reduce the cost.

The thrust bearing 5A is radially positioned between the pump shell 13 and the stator hub 32 to support the thin race 52 of the thrust bearing 5A on the surface of the radially outer portion of the pump hub 14 slightly projecting to the pump shell 13 side in the fitting portion of the pump shell 13 and the pump hub 14. Another thrust bearing 5B is radially positioned between the stator hub 32 and the turbine hub 22 to support the thin race 52 of the thrust bearing 5B on the surface of the radially outer portion of a boss portion 22a projecting toward the stator hub 32 from the turbine hub 22. Since the paired thrust bearings 5A, 5B are aligned by such positioning without using other members, aligning precision which affects durability of the bearings is maintained, while employing a structure in which these paired thrust bearings 5A, 5B are arranged radially outside of the one-way clutch 4.

Oil passages G forming a communicative connection between radially outside and inside of the thrust bearings 5A, 5B are provided on a supporting surface 32a (See FIG. 2) of the stator hub 32 abutting to the thick race 53 of each thrust bearing 5A, 5B so that a communicative connection may be formed between the truss portion of the torque converter and oil passages for supplying and exhausting hydraulic oil by bypassing thrust bearings 5A, 5B. The oil passages G are formed of a plurality of grooves, each of which consists of a radial groove and an axial groove which are continuous with one another. FIG. 2 shows the arrangement of these grooves. In this exemplary embodiment, there are provided 8 grooves spaced equally and circumferentially.

In the torque converter according to the aforementioned arrangement, thrust force is transmitted between the stator 3 and the thrust bearings 5A, 5B without intermediation of the side bearings 45A, 45B of the one-way clutch 4. Since thrust load is not applied to the side bearings 45A, 45B, the side bearings are thinner than conventional side bearings. Also, because thrust force does not need to be transmitted, the shape of the side bearings can be simplified.

Furthermore, since a portion of the thrust bearings 5A, 5B radially overlaps the one-way clutch 4, the axial length required for arranging the one-way clutch 4 and both of the thrust bearings 5A, 5B can be shortened by the axial length of the radially overlapping portion. Thus, the axial length of the area radially inside of the stator 4 can be even shorter. In addition, this reduction of the axial length of the area radially inside of the stator 4 also enables an arrangement which makes good use of an extra space radially inside of a truss portion produced as a result of a reduction of truss portion size with respect to torque ability due to the recent progress in fluid analysis. This arrangement is also effective for shortening the axial length of the entire torque converter.

In this exemplary embodiment, oil passages that needed to be provided on side-bearings of a one-way clutch in conventional arrangements are provided on the molded stator hub 32. Therefore, the shape of the side bearings 45A, 45B can be a simple flat plate without grooves, and thus, the manufacturing cost can be reduced.

In addition, since the thrust bearings 5A, 5B are arranged radially outside of the one-way clutch 4, it becomes possible to improve durability of the thrust bearing by enlarging the diameter of the thrust bearings, for which securing durability is usually more difficult than for a one-way clutch of the same diameter.

In the aforementioned first exemplary embodiment, the stator 3 and the outer race 42 of the one-way clutch 4 are connected by casting on the outer periphery of the outer race 42. However, both the stator 3 and the outer race 42 of the one-way clutch 4 can be connected in various ways. Followings are the explanations on the ways of connecting them.

Figure 3:
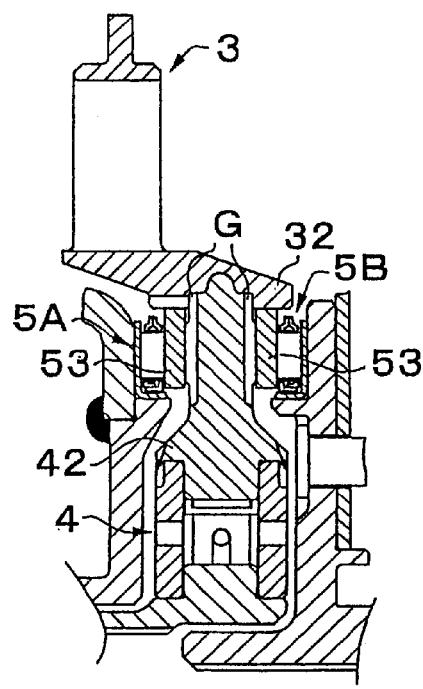
FIG. 3 is a half-cut sectional side view of the second exemplary embodiment of the invention illustrating the same part as FIG. 1.

FIG. 3 shows the second exemplary embodiment of the invention wherein the casting position is changed toward the truss portion side. In this exemplary embodiment, the outer race 42 of the one-way clutch 4 is extended to a blade root position of the stator 3, and the portion of the stator hub 32 extending toward a radially inner area in the first exemplary embodiment is removed. In this position, the stator hub 32 is secured by casting to the outer periphery of the outer race 42 of the one-way clutch 4. Since the casting position is changed in this way, each of the oil passages G, forming a communicative connection between radially outside and inside of the both thrust bearings 5A, 5B, is configured such that a radial groove formed on a supporting surface of the outer race 42 abutting to a thick race 53 of each thrust bearing 5A, 5B is communicatively connected with an axial groove formed on the surface of the radially inner portion of the stator hub 32. Other arrangements of this exemplary embodiment are substantially similar to those of the first exemplary embodiment. This exemplary embodiment produces effects similar to those of the first exemplary embodiment.

Figure 4:
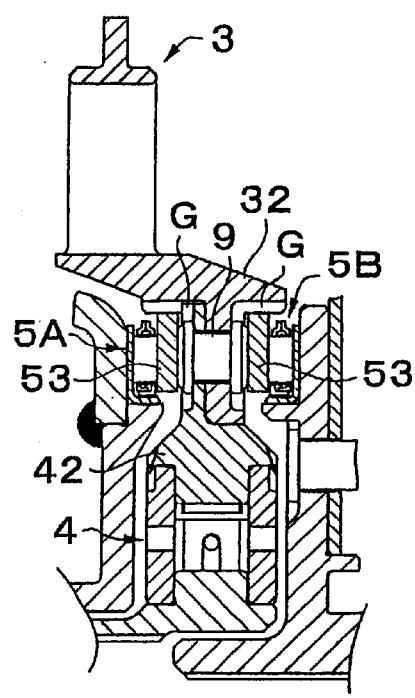
FIG. 4 is a half-cut sectional side view of the third exemplary embodiment of the invention illustrating the same part as FIG. 1.

FIG. 4 shows the third exemplary embodiment of the invention. In this exemplary embodiment, casting is changed to riveting. Referring more particularly to FIG. 4, a portion of the outer race 42 of the one-way clutch 4 is extended to a blade root of the stator 3, and a portion of the stator hub 32 extending toward a radially inner area is thinner than that of the first exemplary embodiment. Both extended portions axially overlap one another. A plurality of rivets 9, inserted into the overlapping portion and arranged circumferentially, secure the outer race 42 and the stator 3. In this exemplary embodiment, the positions of rivets 9 and the thick race 53 of each thrust bearing can be axially matched by matching the radial position of riveting and the diameter of the thrust bearings 5A, 5B. Therefore, thrust force can be transmitted to the thick races 53 on both sides through rivets 9. The oil passages G forming a communicative connection between radially outside and inside of the both thrust bearings 5A, 5B are provided in an arrangement which mixes the arrangements of the first and the second exemplary embodiments. On the thrust bearing 5B side, the oil passages G are provided on the stator hub 32 as a plurality of grooves, each of which consists of a radial groove and an axial groove that are continuous with one another. On the thrust bearing 5A side, radial grooves formed on the outer race 42 are communicatively connected with axial grooves formed on the surface of the radially inner portion of the stator hub 32. The circumferential positions of these grooves may be the same as those of rivets 9 as shown in FIG. 4, or may be different from those of rivets 9. Other arrangements of this exemplary embodiment are substantially similar to those of the first exemplary embodiment. This exemplary embodiment produces effects similar to those of the first exemplary embodiment.

Figure 5:
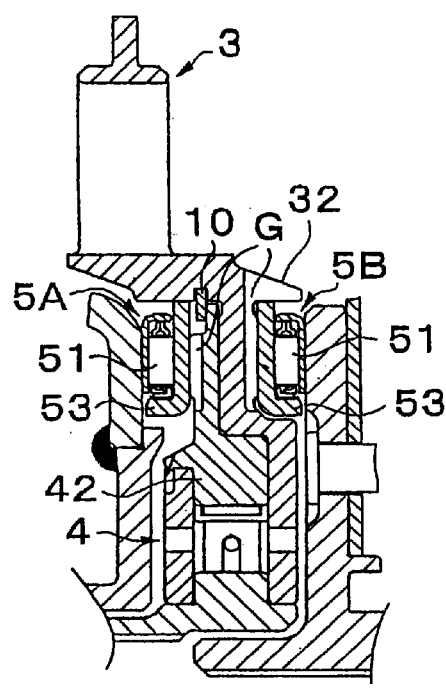
FIG. 5 is a half-cut sectional side view of the fourth exemplary embodiment of the invention illustrating the same part as FIG. 1.

Furthermore, FIG. 5 shows the fourth exemplary embodiment of the invention. In this exemplary embodiment, riveting is changed to snap ring securing. Referring in particular to the drawing, the stator 3 and the outer race 42 are mutually secured in an axial direction by fitting a snap ring 10 into a snap groove formed on the surface of the radially inner area of the blade root of the stator 3. The stator hub 32 and the outer race 42 are aligned in their fitting portion. In addition, a portion of the stator hub 32 extending toward a radially inner area is longer than that of the third exemplary embodiment, and is integrated with one side bearing 45B of the one-way clutch 4. In this exemplary embodiment, both of the thrust bearings 5A, 5B have an L-shape section so that they can be positioned using the thick races 53, and the bending portion supports a cage of a bearing roller 51. In this case, the oil passages G forming a communicative connection between radially outside and inside of the both thrust bearings 5A, 5B are provided in the arrangement similar to that of the aforementioned third exemplary embodiment. Other arrangements of this exemplary embodiment are substantially similar to those of the third exemplary embodiment. This exemplary embodiment produces effects similar to those of the aforementioned each exemplary embodiments.

Figure 6:
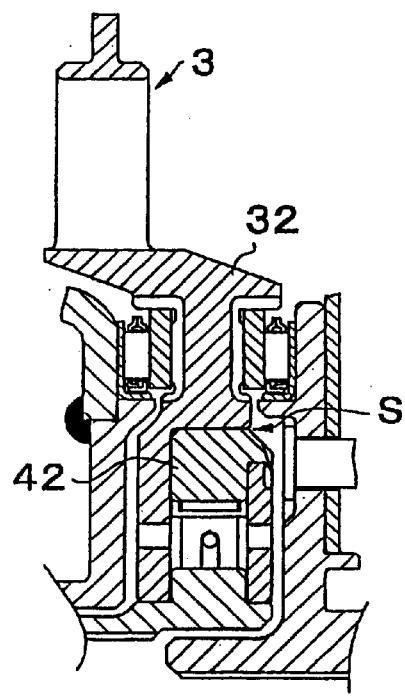
FIG. 6 is a half-cut sectional side view of the fifth exemplary embodiment of the invention illustrating the same part as FIG. 1.

Finally, FIG. 6 shows the fifth exemplary embodiment of the invention. In this exemplary embodiment, casting of the aforementioned first exemplary embodiment is changed to a press-fitting through a serration. In this exemplary embodiment, the stator hub 32 and the outer race 42 are aligned and mutually secured through a serration in an axial direction in a press-fitting portion S. Just as in the aforementioned fourth exemplary embodiment, the stator hub 32 is integrated with one side bearing of the one-way clutch 4. Other arrangements of this exemplary embodiment are substantially similar to those of the first exemplary embodiment. This exemplary embodiment produces effects similar to those of the aforementioned each exemplary embodiments.

Up to this point, five exemplary embodiments of the invention have been explained in detail. However, this invention can be implemented in other various exemplary embodiments. For example, the relationship between the positions of the thrust bearings 5A, 5B and the one-way clutch 4 in the illustrated exemplary embodiments can be reversed. In other words, the one-way clutch 4 can be arranged radially outside of the thrust bearings 5A, 5B. In this case, a supporting surface of a member abutting to the both thrust bearings 5A, 5B is the inner race 41 of the one-way clutch 4. The oil passages on the inner race 41 forming a communicative connection between radially outside and inside of the both thrust bearings 5A, 5B abut to both the thrust bearings 5A, 5B.

What is claimed is:

1. A torque converter, comprising:
   a one-way clutch for supporting a stator radially on a fixed member in such a manner that the stator is rotatable in one direction; and
   thrust bearings for supporting the stator axially between a pump impeller and a turbine runner,
      wherein the diameters of the one-way clutch and the thrust bearings are different, the thrust bearings do not axially overlap at least side bearings of the one-way clutch with respect to an axis of the thrust bearings and the stator is axially supported by the pump impeller and the turbine runner through the thrust bearings.

2. The torque converter according to claim 1, wherein at least a portion of the thrust bearings radially overlaps the one-way clutch.

3. The torque converter according to claim 2, wherein oil passages, forming a communicative connection between radially outside and inside of the thrust bearings, are provided on a supporting surface of a member abutting to the thrust bearings.

4. The torque converter according to claim 3, wherein a first thrust bearing is located between the pump and the member and a second thrust bearing is located between the turbine runner and the member.

5. The torque converter according to claim 1, wherein the thrust bearings are arranged radially outside of the one-way clutch.

6. The torque converter according to claim 1, wherein the one-way clutch includes an outer race and an inner race radially inside of the outer race.

7. The torque converter according to claim 6, wherein the side bearings support the inner race and the outer race.

8. The torque converter according to claim 1, wherein the side bearings have the same shape.

9. The torque converter according to claim 1, wherein the thrust bearings have the same specification.

10. The torque converter according to claim 1, wherein the thrust bearings comprise:
    a first race;
    a second race; and
    a bearing roller spaced circumferentially by a cage and interposed between the first race and the second race.

11. A method of manufacturing a torque converter, comprising:
    supporting a stator radially on a fixed member of a one-way clutch in such a manner that the stator is rotatable in one direction; and
    supporting the stator with thrust bearings axially between a pump impeller and a turbine runner,
        wherein the diameters of the one-way clutch and the thrust bearings are different, the thrust bearings do not axially overlap at least side bearings of the one-way clutch with respect to an axis of the thrust bearings and the stator is axially supported by the pump impeller and the turbine runner through the thrust bearings.

12. The method according to claim 11, wherein at least a portion of the thrust bearings radially overlaps the one-way clutch.

13. The method according to claim 12, wherein oil passages, forming a communicative connection between radially outside and inside of the thrust bearings, are provided on a supporting surface of a member abutting to the thrust bearings.

14. The method according to claim 13, wherein a first thrust bearing is located between the pump and the member and a second thrust bearing is located between the turbine runner and the member.

15. The method according to claim 11, wherein the thrust bearings are arranged radially outside of the one-way clutch.

16. The method according to claim 11, wherein the one-way clutch includes an outer race and an inner race radially inside of the outer race.

17. The method according to claim 16, wherein the side bearings support the inner race and the outer race.

18. The method according to claim 11, wherein the side bearings have the same shape.

19. The method according to claim 11, wherein the thrust bearings have the same specification.

20. The method according to claim 11, wherein the thrust bearings comprise:
    a first race;
    a second race; and
    a bearing roller spaced circumferentially by a cage and interposed between the first race and the second race.

* * * * *